United States Patent
Jia et al.

(10) Patent No.: US 11,009,889 B2
(45) Date of Patent: May 18, 2021

(54) GUIDE ROBOT AND METHOD OF CALIBRATING MOVING REGION THEREOF, AND COMPUTER READABLE STORAGE MEDIUM

(71) Applicant: PING AN TECHNOLOGY (SHENZHEN) CO., LTD., Shenzhen (CN)

(72) Inventors: Huaili Jia, Shenzhen (CN); Bao Zhou, Shenzhen (CN); Zhongcheng Lai, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 212 days.

(21) Appl. No.: 16/084,229

(22) PCT Filed: Jun. 30, 2017

(86) PCT No.: PCT/CN2017/091376
§ 371 (c)(1),
(2) Date: Sep. 12, 2018

(87) PCT Pub. No.: WO2018/068537
PCT Pub. Date: Apr. 19, 2018

(65) Prior Publication Data
US 2019/0056746 A1    Feb. 21, 2019

(30) Foreign Application Priority Data
Oct. 14, 2016   (CN) .......................... 201610899726.2

(51) Int. Cl.
*G05D 1/02*     (2020.01)
*B25J 5/00*     (2006.01)
(Continued)

(52) U.S. Cl.
CPC ............ *G05D 1/0236* (2013.01); *B25J 5/007* (2013.01); *B25J 11/0005* (2013.01);
(Continued)

(58) Field of Classification Search
CPC .. G05D 1/0236; G05D 1/0242; G05D 1/0255; G05D 1/0212; G05D 1/0238;
(Continued)

(56) References Cited

U.S. PATENT DOCUMENTS 5,204,814 A * 4/1993 Noonan ............... G05D 1/0274
701/25
6,119,057 A * 9/2000 Kawagoe ............. G05D 1/0219
15/319

(Continued)

FOREIGN PATENT DOCUMENTS

CN    103192414 A    7/2013
CN    103192414 B    6/2015
(Continued)

OTHER PUBLICATIONS

"Robust and real-time teaching of industrial robots for mass customisation manufacturing using stereoscopic vision;" P. Malheiros; P. Costa; A.P. Moreira; M. Ferreira; 2009 35th Annual Conference of IEEE Industrial Electronics (pp. 2336-2341); Mar. 12, 2010.*
(Continued)

*Primary Examiner* — Khoi H Tran
*Assistant Examiner* — Jorge O Peche

(57) ABSTRACT

The disclosure discloses a method of calibrating a moving region of a guide robot, including: detecting and receiving a movement instruction, and sending the received movement instruction to a controller; determining region calibration parameters corresponding to the received movement instruction according to a predetermined mapping relation between the movement instruction and the region calibration param-
(Continued)

eters, wherein the region calibration parameters include a pending moving region of the guide robot, a light display parameter in the pending moving region, and a driving parameter corresponding to the pending moving region and the light display parameter; driving the light emitting module to carry out light display calibration in the pending moving region according to the determined region calibration parameters. The disclosure further provides the guide robot and a computer storage medium. The technical solution of the disclosure enables the guide robot to display a marked region to be passed.

16 Claims, 7 Drawing Sheets

(51) Int. Cl.
    *B25J 11/00*     (2006.01)
    *G08B 5/36*     (2006.01)

(52) U.S. Cl.
    CPC .......... *B25J 11/008* (2013.01); *G05D 1/0242* (2013.01); *G05D 1/0255* (2013.01); *G08B 5/36* (2013.01)

(58) Field of Classification Search
    CPC ...... B25J 5/007; B25J 11/0005; B25J 11/008; B25J 9/1666; B25J 9/1676; B25J 9/1692; G08B 5/36
    See application file for complete search history.

(56) References Cited

U.S. PATENT DOCUMENTS

| | | | |
|---|---|---|---|
| 6,433,679 B1* | 8/2002 | Schmid | B60Q 9/007 340/435 |
| 2006/0106496 A1* | 5/2006 | Okamoto | G05D 1/0278 700/253 |
| 2006/0195226 A1* | 8/2006 | Matsukawa | B25J 9/162 700/245 |
| 2007/0192910 A1* | 8/2007 | Vu | B25J 19/06 700/245 |
| 2008/0161970 A1* | 7/2008 | Adachi | B25J 9/1676 700/253 |
| 2008/0164985 A1* | 7/2008 | Iketani | G01S 17/89 340/435 |
| 2009/0146795 A1* | 6/2009 | Matsumoto | G06Q 10/087 340/10.5 |
| 2012/0197439 A1* | 8/2012 | Wang | G05D 1/0038 700/259 |
| 2013/0088593 A1* | 4/2013 | Ishimoto | H04N 7/18 348/143 |
| 2014/0067121 A1* | 3/2014 | Brooks | B25J 9/1676 700/255 |
| 2014/0150820 A1* | 6/2014 | Yoo | A47L 11/4011 134/6 |
| 2014/0163736 A1* | 6/2014 | Azizian | A61B 6/4441 700/259 |
| 2015/0042485 A1 | 2/2015 | Suessemilch et al. | |
| 2015/0158178 A1* | 6/2015 | Burmeister | B25J 9/1697 382/203 |
| 2015/0217455 A1* | 8/2015 | Kikkeri | G06T 7/20 700/259 |
| 2015/0306770 A1* | 10/2015 | Mittal | B25J 19/027 700/255 |
| 2016/0016315 A1* | 1/2016 | Kuffner, Jr. | B25J 9/1676 700/255 |
| 2016/0229059 A1* | 8/2016 | Ebrahimi Afrouzi | B25J 9/1694 |
| 2016/0229068 A1* | 8/2016 | Haman | F16P 3/00 |
| 2016/0279797 A1* | 9/2016 | Zunke | B25J 9/1692 |
| 2016/0354926 A1* | 12/2016 | Frensch | B25J 9/1666 |
| 2016/0361125 A1* | 12/2016 | Balicki | B25J 19/06 |
| 2016/0375592 A1* | 12/2016 | Szatmary | B25J 9/1676 700/255 |
| 2017/0008521 A1* | 1/2017 | Braunstein | G06K 9/00791 |
| 2017/0087722 A1* | 3/2017 | Aberg | B25J 9/1676 |
| 2017/0120460 A1* | 5/2017 | Burmeister | G08B 21/02 |
| 2017/0158127 A1* | 6/2017 | Akiyama | B60W 50/14 |
| 2017/0197313 A1* | 7/2017 | Nishino | A61B 5/02055 |
| 2017/0197616 A1* | 7/2017 | Ichikawa | B60T 7/22 |
| 2017/0199299 A1* | 7/2017 | Braune | B25J 9/1674 |
| 2017/0243070 A1* | 8/2017 | Janssen | G06K 9/00798 |
| 2017/0282362 A1* | 10/2017 | Erhart | B25J 11/008 |
| 2017/0368691 A1* | 12/2017 | Li | G05D 1/0223 |
| 2018/0093378 A1* | 4/2018 | Yamamoto | B25J 9/1676 |
| 2019/0007659 A1* | 1/2019 | Neubauer | G06T 7/593 |
| 2019/0030716 A1* | 1/2019 | Chevallereau | B25J 9/1676 |
| 2019/0056746 A1 | 2/2019 | Jia et al. | |
| 2019/0084158 A1* | 3/2019 | Atherton | G05B 19/048 |
| 2019/0100139 A1* | 4/2019 | Koravadi | B60Q 9/002 |
| 2019/0111843 A1* | 4/2019 | Yamada | B62D 15/029 |
| 2019/0160675 A1* | 5/2019 | Paschall, II | G05D 1/0214 |
| 2019/0184981 A1* | 6/2019 | Jung | G05D 1/0221 |
| 2019/0235512 A1* | 8/2019 | Sinyavskiy | G05D 1/0217 |
| 2019/0244524 A1* | 8/2019 | Tanaka | G05D 1/0214 |
| 2019/0265703 A1* | 8/2019 | Hicok | G06Q 50/30 |
| 2019/0351554 A1* | 11/2019 | Onose | B25J 9/1676 |
| 2019/0351558 A1* | 11/2019 | Park | B25J 13/06 |
| 2019/0378264 A1* | 12/2019 | Braune | H04N 13/207 |
| 2020/0012292 A1* | 1/2020 | Park | B25J 11/0085 |
| 2020/0012293 A1* | 1/2020 | Lee | G05D 1/0242 |
| 2020/0016760 A1* | 1/2020 | Lee | B25J 13/086 |
| 2020/0033857 A1* | 1/2020 | Yu | G05D 1/0248 |
| 2020/0061838 A1* | 2/2020 | Amacker | B25J 15/0014 |
| 2020/0073401 A1* | 3/2020 | Szatmary | G05D 1/0077 |
| 2020/0086482 A1* | 3/2020 | Johnson | G06N 3/08 |
| 2020/0097011 A1* | 3/2020 | Mika | B25J 9/1664 |
| 2020/0114515 A1* | 4/2020 | Thackston | B25J 9/1653 |
| 2020/0198140 A1* | 6/2020 | Dupuis | B25J 9/1666 |
| 2020/0225673 A1* | 7/2020 | Ebrahimi Afrouzi | G05D 1/0214 |
| 2020/0242937 A1* | 7/2020 | Omiya | G08G 1/16 |
| 2020/0331146 A1* | 10/2020 | Vu | G06F 3/011 |
| 2020/0331155 A1* | 10/2020 | Vu | G08B 5/36 |

FOREIGN PATENT DOCUMENTS

| | | |
|---|---|---|
| CN | 205334234 U | 6/2016 |
| CN | 205466246 U | 8/2016 |
| CN | 106406312 A | 2/2017 |
| CN | 206075140 U | 4/2017 |
| EP | 2837473 A2 | 2/2015 |
| JP | 2003323214 A | 11/2003 |
| JP | 2007102488 A | 4/2007 |
| JP | 2008137127 A | 6/2008 |
| JP | 2009123045 A | 6/2009 |
| JP | 4830438 B2 | 12/2011 |
| JP | 2012236244 A | 12/2012 |
| JP | 2013107184 A | 6/2013 |
| JP | WO 2019/239848 A1 * | 12/2019 |
| KR | 2019-0022433 A * | 3/2019 |
| TW | 201603976 A | 2/2016 |
| WO | 2009063318 A1 | 5/2009 |

OTHER PUBLICATIONS

"Multi 3D camera mapping for predictive and reflexive robot manipulator trajectory estimation;" Justinas Miseikis, Kyrre Glette, Ole Jakob Elie, Jim Torresen; 2016 IEEE Symposium Series on Computational Intelligence (SSCI) (pp. 1-8) Dec. 1, 2016.*
Written Opinion of Singaporean Patent Application No. 11201808816U dated Mar. 30, 2020.
Search Report of European Patent Application No. 17860420.3 dated Jul. 23, 2019.

* cited by examiner

US 11,009,889 B2

GUIDE ROBOT AND METHOD OF CALIBRATING MOVING REGION THEREOF, AND COMPUTER READABLE STORAGE MEDIUM

CROSS REFERENCE TO RELATED APPLICATIONS

This application is a national phase entry of the international application PCT/CN2017/091376, filed on Jun. 30, 2017 and claims priority to China Patent Application No. CN2016108997262, filed on Oct. 14, 2016 and entitled "Guide Robot and Method of Calibrating Moving Region thereof", which is hereby incorporated by reference in its entirety.

TECHNICAL FIELD

This disclosure relates generally to the field of guide robots, and more particularly relates to a guide robot and a method of calibrating a moving region thereof, and a computer readable storage medium.

BACKGROUND

An independent guide robot is a kind of smart robot, which is applied to a place such as an exhibition hall, and is capable of guiding visitors to different functional regions according to a business requirement, making corresponding explanations and answering relevant questions. It can move fast through two driving wheels and one driven wheel that are arranged at the bottom. At the present, the guide robot is positioned and avoids obstacles via its own sensors, but in actual application, people find that various emergencies will occur during moving or steering of the guide robot, for example:

1. in a moving process of the guide robot, if someone stands on its movement track, the guide robot will automatically avoid the obstacle according to feedback information of its own sensors, but due to its unpredictable obstacle avoiding direction, it will avoid the obstacle towards one side based on instinctive reaction, so that such a phenomenon of secondary or multiple times of mutual avoiding between the guide robot and people, which is caused by the fact that the avoiding direction of people is consistent with the obstacle avoiding direction of the guide robot, often occurs, and it takes more time for the robot or the robot selects a non-optimal path to reach a preset region, and even the robot misjudges that there is an unbridgeable obstacle around, and it may not reach the preset region and would go around in circles, thus affecting normal operation of the robot.

2. when the guide robot suddenly moves from a static state, as people do not know that the guide robot would move in advance, and even do not know which direction that the guide robot would move towards, such a phenomenon that people burst in a region, at which the guide robot will arrive, occurs easily, which leads to collision between the guide robot and people, resulting in injury to people or damage, malfunctions and the like of the guide robot.

SUMMARY

The disclosure mainly aims to provide a guide robot and a method of calibrating a moving region thereof, and a computer readable storage medium, and aims at enabling the guide robot to display and calibrate regions through which it will pass, and providing a visible movement trend prompt to avoid a phenomenon of collision between people and the robot or multiple times of avoiding and the like.

To achieve the above objective, a method of calibrating a moving region of a guide robot is provided. The guide robot includes a signal receiving unit for receiving a movement instruction, a controller and a light emitting module. The method includes:

a1. detecting and receiving, by the signal receiving unit, the movement instruction, and sending the received movement instruction to the controller;

a2. determining, by the controller, region calibration parameters corresponding to the received movement instruction according to a predetermined mapping relation between the movement instruction and the region calibration parameters, wherein the region calibration parameters include a pending moving region of the guide robot, a light display parameter in the pending moving region, and a driving parameter corresponding to the pending moving region and the light display parameter;

a3. driving, by the controller, the light emitting module to carry out light display calibration in the pending moving region according to the determined region calibration parameters.

Preferably, before the step a1, the method of calibrating the moving region also includes:

obtaining, by the controller, preset normally-on warning region parameters, wherein the normally-on warning region parameters include a normally-on warning region, a light display parameter in the normally-on warning region, and a driving parameter corresponding to the normally-on warning region and the light display parameter in the normally-on warning region, and the normally-on warning region is a region surrounding the guide robot;

driving, by the controller, the light emitting module to carry out light display calibration in the normally-on warning region according to the obtained normally-on warning region parameters.

Preferably, the step a2 includes:

determining, by the controller, the region calibration parameters corresponding to the received movement instruction according to the predetermined mapping relation between the movement instruction and the region calibration parameters, determining a moving prewarning region according to the determined region calibration parameters, and detecting whether an obstacle exists within a preset size range on a movement path corresponding to the movement instruction or not, wherein the region calibration parameters include the pending moving region of the guide robot, the pending moving region includes the normally-on warning region and a maximum warning region, and the moving prewarning region is an annular region surrounded by the normally-on warning region and the maximum warning region;

determining, by the controller, region calibration parameters of the light emitting module in the moving prewarning region according to an obstacle detection result.

Preferably, the step of determining, by the controller, the region calibration parameters of the light emitting module in the moving prewarning region according to the obstacle detection result includes:

detecting, by a provided distance sensor, a distance d between the obstacle and the robot in real time or regularly;

if the detected distance d is shorter than or equal to the minimum warning distance $d_{min}$ between the obstacle and the normally-on warning region, determining that the region calibration parameters are predetermined first region calibration parameters;

if the detected distance d is longer than the minimum warning distance $d_{min}$ between the obstacle and the normally-on warning region, and shorter than or equal to the maximum warning distance $d_{max}$ between the obstacle and the maximum warning region, detecting a current speed v of the robot, calculating current warning parameters according to the detected distance d and the current speed v of the robot based on a preset first warning parameter formula, and determining that second region calibration parameters corresponding to the calculated warning parameters are the region calibration parameters according to a predetermined mapping relation between the warning parameter and the region calibration parameter;

if the detected distance d is longer than the maximum warning distance $d_{max}$ between the obstacle and the maximum warning region, detecting the current speed v of the robot, determining the maximum design speed $v_{max}$ of the robot, calculating current warning parameters according to the current speed v and the maximum design speed $v_{max}$ of the robot based on a preset second warning parameter formula, and determining that third region calibration parameters corresponding to the calculated warning parameters are the region calibration parameters according to a predetermined mapping relation between the warning parameter and the region calibration parameter.

To achieve the above objective, a guide robot is further provided, including a shell, a controller, a memory and a light emitting module arranged on the shell. The light emitting module is electrically connected with the controller; the controller has a signal input end for receiving a movement instruction; the guide robot also includes a moving region calibration program which is stored on the memory and is operated in the controller; and the moving region calibration program is executed by the controller to implement the following steps:

a1. detecting and receiving the movement instruction;

a2. determining region calibration parameters corresponding to the received movement instruction according to a predetermined mapping relation between the movement instruction and the region calibration parameters, wherein the region calibration parameters include a pending moving region of the guide robot, a light display parameter in the pending moving region, and a driving parameter corresponding to the pending moving region and the light display parameter;

a3. driving the light emitting module to carry out light display calibration in the pending moving region according to the determined region calibration parameters.

To achieve the above objective, a computer readable storage medium is further provided, which is applied to the guide robot. The computer readable storage medium stores a moving region calibration program which is executed by a controller to implement the following steps:

a1. detecting and receiving the movement instruction;

a2. determining region calibration parameters corresponding to the received movement instruction according to a predetermined mapping relation between the movement instruction and the region calibration parameters, wherein the region calibration parameters include a pending moving region of the guide robot, a light display parameter in the pending moving region, and a driving parameter corresponding to the pending moving region and the light display parameter;

a3. driving the light emitting module to carry out light display calibration in the pending moving region according to the determined region calibration parameters.

According to the technical solutions of the disclosure, the guide robot determines the pending moving region corresponding to the movement instruction at receiving of the movement instruction, and then controls a display module to carry out the light display calibration in the pending moving region, so that a movement direction and a movement trend of the guide robot may be visibly displayed, and people can accurately avoid the guide robot, thereby avoiding occurrence of a phenomenon of a collision accident between people and the guide robot, which protects the safety of people and the guide robot, and enables the guide robot to move more efficiently.

BRIEF DESCRIPTION OF THE DRAWINGS

To make a clearer description to embodiments of the disclosure or technical solutions in the prior art, a brief introduction will be made below to the embodiments or accompanying drawings to be used in description of the prior art. Obviously, the accompanying drawings described below are merely some embodiments of the disclosure. Ordinary persons skilled in the art also can get other accompanying drawings according to structures as shown in these drawings without paying creative work.

Achieving of objectives, functional features, and advantages of this disclosure will be described below in further detail in connection with the accompanying drawings.

DETAILED DESCRIPTION OF EMBODIMENTS

A clear and complete description will be made below to the technical solutions in embodiments of the disclosure in combination with the accompanying drawings in the embodiments of the disclosure. Obviously, the embodiments described herein are merely part of embodiments of the disclosure, but not all the embodiments. Based on the embodiments in the disclosure, all the other embodiments obtained by the ordinary persons skilled in the art without paying creative work shall fall within the scope of protection of the disclosure.

Figure 1:
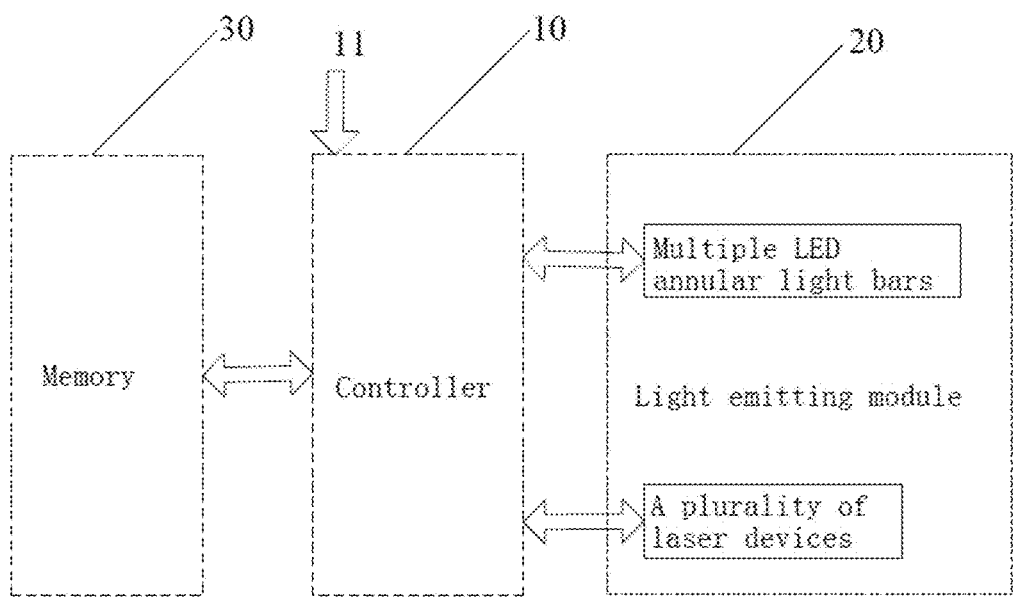
FIG. 1 is a structure diagram of hardware of a first embodiment of a guide robot of the disclosure.

A guide robot is provided, as shown in FIG. 1. A light emitting module 20 is mainly additionally arranged on the guide robot, and is controlled by a controller 10 to work to carry out light display calibration on a region where the guide robot is about to move, so that people can visibly know a movement direction and a movement trend of the guide robot, thereby effectively avoiding emergencies such as collision and multiple times of avoiding between people and the guide robot, and protecting the safety of people and the guide robot.

The guide robot of this embodiment includes a shell (not shown in the figure), the controller 10, the light emitting module 20 arranged on the shell, and a memory 30 electrically connected with the controller 10, and of course, also includes two driving wheels and one driven wheel which are arranged at the bottom end of the shell. The light emitting module 20 is electrically connected with the controller 10; the controller 10 has a signal input end 11 for receiving a movement instruction; the signal input end 11 may include a port for receiving a Bluetooth signal, a port for receiving a network communication signal, a port for receiving own sensor signals, and the like.

The memory 30 at least includes one type of readable storage medium which includes a flash memory, a hard disk, a multimedia card, a card memory (such as a Secure Digital (SD) or DX memory), a Random Access Memory (RAM), a Static Random Access Memory (SRAM), a Read-Only Memory (ROM), an Electrical Erasable Programmable Read-Only Memory (EEPROM), a Programmable Read-Only Memory (PROM), a magnetic memory, a magnetic disk, an optical disk and the like.

In some embodiments, the memory 30 may be an internal storage unit of the guide robot, for example a hard disk of the guide robot. In some other embodiments, the memory 30 also may be external storage equipment of the guide robot, such as a plugin hard disk equipped on the guide robot, a Smart Media Card (SMC), an SD card and a Flash Card (FC). Further, the memory 30 also may include the internal storage unit of the guide robot and the external storage equipment, and may be used for storing application software installed on the guide robot and all types of data, such as a code of a moving region calibration program, and used for temporarily storing data that have been output or are about to output.

The guide robot also includes the moving region calibration program which is stored in the memory 30 and may be operated on the controller 10. The moving region calibration program is executed by the controller 10 to implement the following steps:

a1. the movement instruction is detected and received;

a2. region calibration parameters corresponding to the received movement instruction are determined according to a predetermined mapping relation between the movement instruction and the region calibration parameters, wherein the region calibration parameters include a pending moving region of the guide robot, a light display parameter in the pending moving region, and a driving parameter corresponding to the pending moving region and the light display parameter;

a3. the light emitting module is driven to carry out light display calibration in the pending moving region according to the determined region calibration parameters.

The controller 10 drives the light emitting module 20 according to its received movement instruction to carry out light display on a corresponding region around the shell; the corresponding region is a region (namely a pending moving region) where the guide robot is about to move according to the movement instruction. The mapping relation between the movement instruction and the pending moving region is preset in the controller 10, so that the guide robot may display and calibrate its pending moving region through the light emitting module 20 to visibly reflect a movement trend of the guide robot.

Further, the controller 10 is also used for executing the moving region calibration program to further implement the following steps before the step a1:

preset normally-on warning region parameters are obtained, wherein the normally-on warning region parameters include a normally-on warning region, a light display parameter in the normally-on warning region, and a driving parameter corresponding to the normally-on warning region and the light display parameter in the normally-on warning region, and the normally-on warning region is a region surrounding the guide robot;

the light emitting module is driven to carry out light display calibration in the normally-on warning region according to the obtained normally-on warning region parameters.

Figure 5:
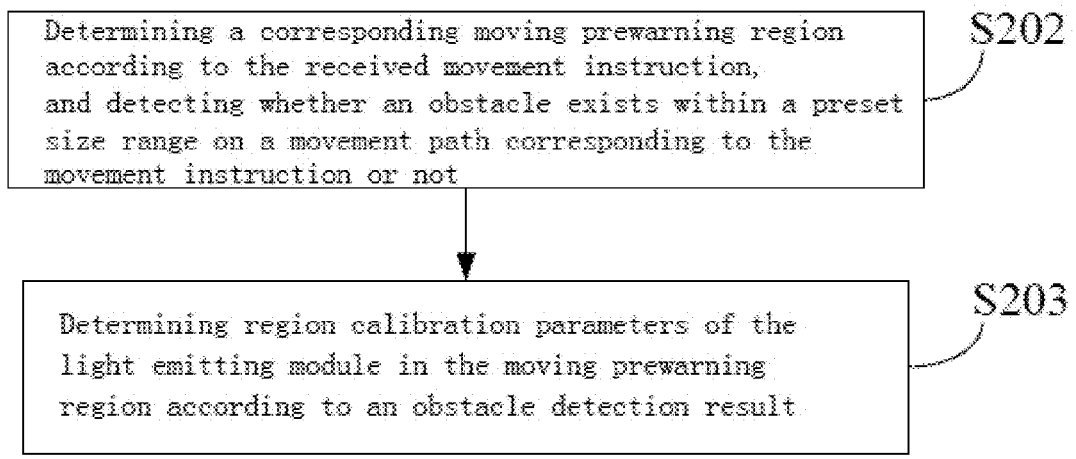
FIG. 5 is a flowchart of a third embodiment of a method of calibrating a moving region of a guide robot of the disclosure.

The pending moving region includes the normally-on warning region (a circular region D in FIG. 5) and a maximum warning region (a circular region X in FIG. 5). A plurality of sensors (which may be ultrasonic sensors, infrared sensors and the like) distributed along the circumferential direction of the shell are also arranged on the shell in this embodiment. The sensors are electrically connected with the controller 10, and are used for detecting whether an obstacle exists in the corresponding region around the shell or not and feeding detection results back to the controller 10. The controller 10 may enable the sensors to detect whether the obstacle exists within a preset size range on a path corresponding to the received movement instruction or not at first, then determine the region calibration parameters (for example, the region calibration parameters include a flicker frequency and a color of light) of the light emitting module 20 in the moving prewarning region (for example, an annular region surrounded by the circular regions D and X in FIG. 5) according to the detection results of the sensors, and finally find the driving parameter, which corresponds to the moving prewarning region, of the light emitting module 20 according to the determined region calibration parameters to drive the light emitting module 20 according to the found driving parameter to carry out light warning calibration in the moving prewarning region.

Further, the step a2 includes:

the region calibration parameters corresponding to the received movement instruction are determined according to the predetermined mapping relation between the movement instruction and the region calibration parameters, the moving prewarning region is determined according to the determined region calibration parameters, and whether an obstacle exists within a preset size range on a movement path corresponding to the movement instruction or not is detected, wherein the region calibration parameters include the pending moving region of the guide robot, the pending moving region includes the normally-on warning region and the maximum warning region, and the moving prewarning region is an annular region surrounded by the normally-on warning region and the maximum warning region;

the region calibration parameters of the light emitting module in the determined moving prewarning region are determined according to an obstacle detection result.

It should be noted that the step that the region calibration parameters of the light emitting module in the moving prewarning region (the annular region surrounded by the circular regions D and X in FIG. 5) are determined according to the obstacle detection result includes:

a provided distance sensor detects a distance d between the obstacle and the robot in real time or regularly;

if the detected distance d is shorter than or equal to the minimum warning distance $d_{min}$ (for example, a distance between an intersection, which is formed by a connecting line of the obstacle and the robot and a boundary line of the normally-on warning region, and the robot is the minimum warning distance between the obstacle and the normally-on warning region) between the obstacle and the normally-on warning region, the region calibration parameters are determined as predetermined first region calibration parameters;

if the detected distance d is longer than the minimum warning distance $d_{min}$ between the obstacle and the normally-on warning region, and shorter than or equal to the maximum warning distance $d_{max}$ (for example, a distance between an intersection, which is formed by the connecting line of the obstacle and the robot and a boundary line of the maximum warning region, and the robot is the maximum warning distance between the obstacle and the maximum warning region) between the obstacle and the maximum warning region, a current speed v of the robot is detected, current warning parameters f(d, v) are calculated according to the detected distance d and the current speed v of the robot based on a preset first warning parameter formula (for example, the first warning parameter formula is as follows: f(d, v)=c+m*(v/d), c and m are both constants), and second region calibration parameters corresponding to the calculated warning parameters are determined as the region calibration parameters according to a predetermined mapping relation between the warning parameter and the region calibration parameter;

if the detected distance d is longer than the maximum warning distance $d_{max}$ between the obstacle and the maximum warning region, the current speed v of the robot is detected, the maximum design speed $v_{max}$ of the robot is determined, current warning parameters f(d, v) are calculated according to the current speed v and the maximum design speed $v_{max}$ of the robot based on a preset second warning parameter formula (for example, the second warning parameter formula is as follows: f(d, v)=c+n*(v/$v_{max}$), c and m are both constants), and third region calibration parameters corresponding to the calculated warning parameters are determined as the region calibration parameter according to a predetermined mapping relation between the warning parameter and the region calibration parameter.

Further, according to the guide robot of this embodiment, the light emitting module 20 is arranged on the outer surface of a chassis of the shell, so that the light emitting module 20 may not destroy the original appearance of the guide robot, and is closer to the ground to make a light effect displayed on the ground brighter and clearer.

Furthermore, the light emitting module 20 of this embodiment includes a plurality of LED annular light bars which are axially arranged in a spacing manner; and the outer ring walls of the LED annular light bars are luminous surfaces, and tilt downwards. As the outer ring walls of the LED annular light bars tilt downwards, light rays emitted by the LED annular light bars are projected towards the periphery of the shell to form a corresponding annular light display region; the controller 10 controls on-off states of LED light beads at different positions on the LED annular light bars, thus realizing light display in different regions. The LED annular light bars of this embodiment are LED multi-color light bars, so that the controller 10 may adjust and control display colors of the LED annular light bars in the pending moving region, and the pending moving region is more colorful and striking, wherein the LED annular light bar at the innermost ring may be independently connected with the controller 10 so as to be kept in a normally-on state, so that the normally-on warning region is formed around the shell; all the rest LED annular light bars are connected in series with one another, so that only an input pin of the first lamp of the rest LED annular light bars needs to be connected to the signal output end of the controller 10; and the controller 10 controls the rest LED annular light bars to realize light display of the pending moving region.

Further, the light emitting module 20 of this embodiment also includes a plurality of laser devices which are distributed on the chassis of the shell along the LED annular light bars in a spacing manner. As laser emitted by the laser devices has the characteristics of large emission range, bright color, high brightness, high directivity, small light dispersion degree and the like, the multiple laser devices of the light emitting module 20 may highlight edges of the pending moving region and the warning regions, and ranges of the pending moving region and the warning regions are more definite. An edge display mode of the laser devices for the pending moving region and the warning regions is as follows: each laser device displays a curved line segment, and the multiple laser devices are arranged according to a specific mode, so that the curved line segments of the multiple laser devices are spliced to form the edge of the pending moving region or the edges of the warning regions; and the specific arrangement of the laser devices may be correspondingly adjusted according to a display demand.

Figure 2:
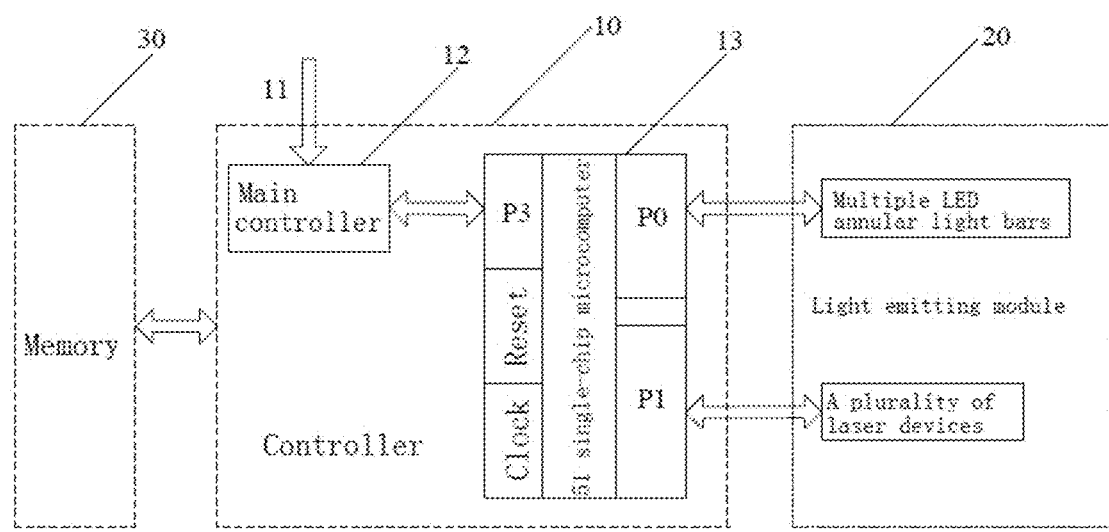
FIG. 2 is a structure diagram of hardware of a second embodiment of a guide robot of the disclosure.

Further, with reference to FIG. 2, in one embodiment, the controller 10 includes a main controller 12 and a 51 single-chip microcomputer 13. The 51 single-chip microcomputer 13 has four groups of I/O ports which may be used as input or output ports. In this embodiment, the LED annular light bars are connected with the first group of parallel I/O ports (for example ports P0 of the 51 single-chip microcomputer 13) of the 51 single-chip microcomputer 13; the laser devices are connected with the second group of parallel I/O ports (for example ports P1 of the 51 single-chip microcomputer 13) of the 51 single-chip microcomputer 13; the signal output end of the main controller 12 is connected with a serial I/O port (for example, a port P3 of the 51 single-chip microcomputer 13) of the 51 single-chip microcomputer 13 to realize communication with the main controller 12 through the serial I/O port and receive a control signal output by the main controller 12. The main controller 12 is mainly used for receiving control information of an upper computer and all types of sensor data of the guide robot itself, then carrying out fusion calculation on these pieces of information according to a set logic to generate a corresponding control instruction, and transmitting the control instruction to the 51 single-chip microcomputer 13; therefore, in this embodiment, intelligent terminal equipment which is of an Advanced RISC Machine (ARM) system structure and is loaded with an open-source Linux system may be preferably selected as the main controller 12. Such selection has the advantages below: 1) a control chip of the ARM structure has an extremely large occupancy rate in an embedded market, so that the product selection range is relatively wide; 2) most of the sensor data are floating-point numbers, so that the computation capacity of ARM is outstanding; 3) the ARM may well operate a mainstream Linux system, and facilitates transplanting; 4) relatively complete types of drives may well support connections between all types of sensors and networks; and 5) an ARM chip has various interfaces, and may be accessed into or control other peripherals very conveniently through a General Purpose Input/Output (GPIO) or a Universal Asynchronous Receiver/Transmitter (UART). In other embodiments, the controller 10 also may be a main controller having I/O ports; the LED annular light bars and the laser devices are connected to the corresponding ports of the main controller; the main controller receives control information of an upper computer and all types of sensor data of the guide robot itself, then carries out fusion calculation on these pieces of information according to a set logic to generate a corresponding control instruction, and transmits the control instruction to the connected LED annular light bars and laser devices through the I/O ports.

A method of calibrating a moving region of a guide robot is further provided. The guide robot includes a signal receiving unit for receiving a movement instruction, a controller and a light emitting module. The implementation of the method of the disclosure may be based on the above provided technical solution of the guide robot.

Figure 3:
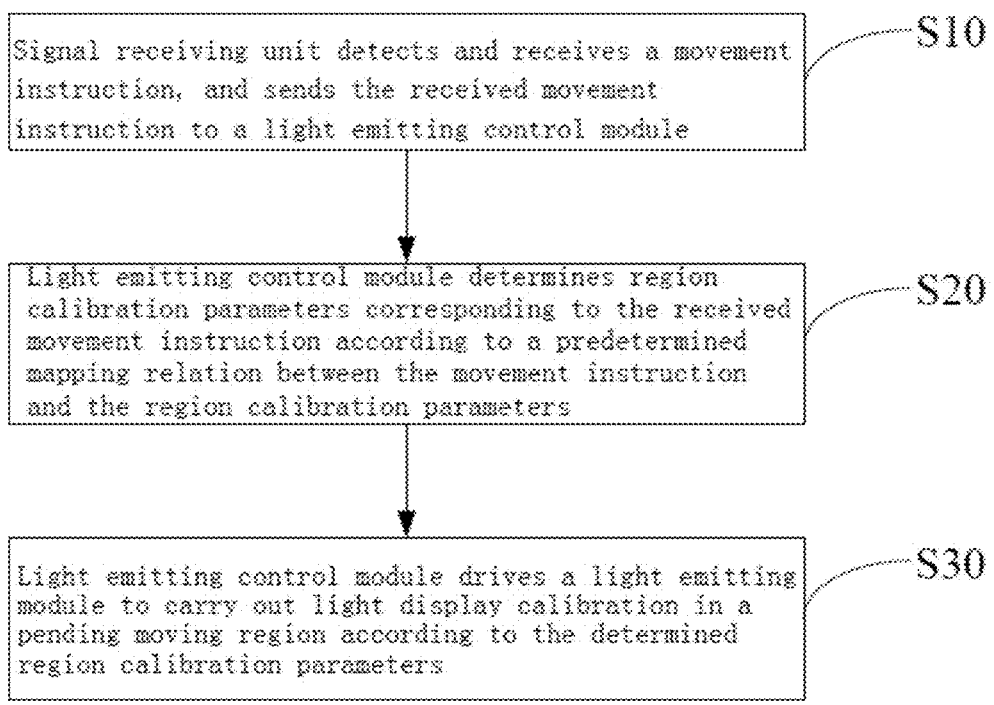
FIG. 3 is a flowchart of a first embodiment of a method of calibrating a moving region of a guide robot of the disclosure.

As shown in FIG. 3, which is a flowchart of a first embodiment of the method of calibrating the moving region of the guide robot of the disclosure, in this embodiment, the method of calibrating the moving region of the guide robot includes:

Step S10, the signal receiving unit detects and receives the movement instruction, and sends the received movement instruction to the controller;

the signal receiving unit detects whether there is a movement instruction request or not in real time, and receives the movement instruction if the movement instruction is detected; the movement instruction may be a network instruction, a Bluetooth signal instruction or own sensor signals and the like, such as a touch signal instruction generated by a touch screen of the guide robot and a voice instruction received by a voice sensor of the guide robot; and after receiving the movement instruction, the signal receiving unit sends the received instruction to the controller to enable the controller to carry out subsequent processing operation.

Step S20, the controller determines region calibration parameters corresponding to the received movement instruction according to a predetermined mapping relation between the movement instruction and the region calibration parameters, wherein the region calibration parameters include a pending moving region of the guide robot, a light display parameter in the pending moving region, and a driving parameter corresponding to the pending moving region and the light display parameter;

a mapping relation table between the movement instruction and the region calibration parameters is preset in the controller; after receiving the movement instruction, the controller may determine the region calibration parameters corresponding to the movement instrument by looking up the preset mapping relation table, wherein the pending moving region of the guide robot is a region where the guide robot is about to move according to the movement instruction; for example, when the movement instruction is forward or backward movement, the pending moving region includes a section of region in front of or behind the guide robot; when the movement instruction is left or right turning, the pending moving region includes a region covering paths through which the guide robot may pass during left or right turning. In addition, the light display parameters in the pending moving region may include a color, brightness, a display form and the like; the display form may include normally-on display, flickering display, flowing display and the like; the light calibration colors and the display modes of the pending moving regions corresponding to different movement instructions may be designed to be different, so that a calibrated region may be displayed in multi-color and diversified manners, attracts the attentions of people more easily, and also would be more beautiful.

Step S30, the controller drives the light emitting module to carry out light display calibration in the pending moving region according to the determined region calibration parameters.

After determining the region calibration parameters corresponding to the movement instruction, the controller drives the light emitting module to carry out the light display with the light color, the brightness and the display form, which are determined, in the determined pending moving region.

According to the method of calibrating the moving region of the guide robot of the embodiment, the guide robot determines the pending moving region corresponding to the movement instruction at receiving of the movement instruction, and then controls a display module to carry out the light display calibration in the pending moving region, so that a movement direction and a movement trend of the guide robot may be visibly displayed, and people can accurately avoid the guide robot, thereby avoiding occurrence of a phenomenon of a collision accident between people and the guide robot, which protects the safety of people and the guide robot, and enables the guide robot to move more efficiently.

Figure 4:
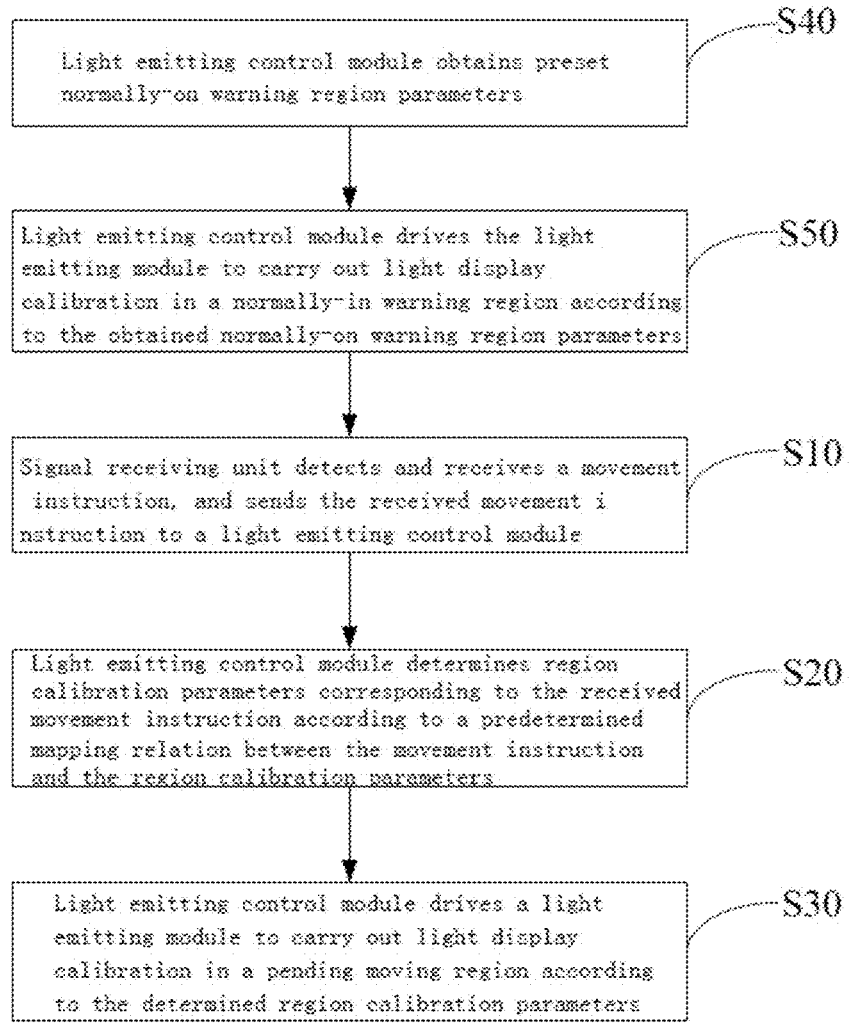
FIG. 4 is a flowchart of a second embodiment of a method of calibrating a moving region of a guide robot of the disclosure.
Figure 6:
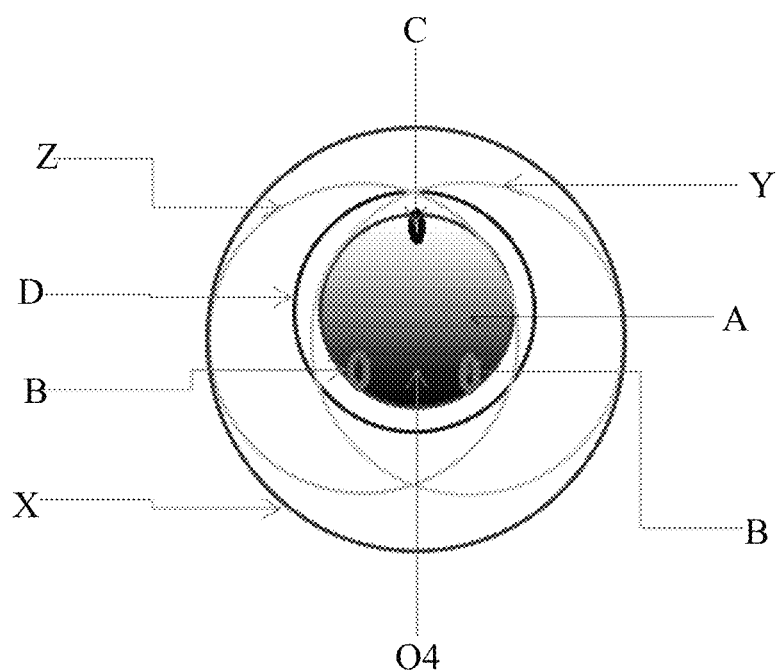
FIG. 6 is a schematic diagram of a design scheme of division of a light display region of a guide robot of the disclosure.

As shown in FIG. 4, which is a flowchart of a second embodiment of a method of calibrating a moving region of a guide robot of the disclosure, this embodiment is based on the solution of the above-mentioned first embodiment. In this embodiment, the pending moving region includes a normally-on warning region (a circular region D as shown in FIG. 6). Before the step S10, the method of calibrating the moving region of the guide robot also includes:

Step S40, the controller obtains preset normally-on warning region parameters, wherein the normally-on warning region parameters include the normally-on warning region, a light display parameter in the normally-on warning region, and a driving parameter corresponding to the normally-on warning region and the light display parameter in the normally-on warning region, and the normally-on warning region is a region surrounding the guide robot;

after the guide robot is switched on, the controller obtains the normally-on warning region parameters preset in a system; the light display parameters of the normally-on warning region include a color, brightness, a display form and the like in the normally-on warning region, wherein the preset normally-on warning region surrounds the guide robot, and is mainly used for warning people against putting feet or other objects in the normally-on warning region; this normally-on warning region does not need to be very large as long as places outside the normally-on warning region are safe; and the normally-on warning region may be an annular region surrounding the guide robot, and also may be regions in other shapes surrounding the guide robot.

Step S50, the controller drives the light emitting module to carry out light display calibration in the normally-on warning region according to the obtained normally-on warning region parameters.

The controller drives the light emitting module to carry out the light display with the color, the brightness and the form, which are determined, in the normally-on warning region according to the obtained normally-on warning region parameters; the normally-in warning region is kept being displayed when the guide robot is static, moving and steering and in various abnormal states to always keep a safe warning effect to remind people of not moving into this region all the time.

According to the technical solution of this embodiment, after the guide robot is switched on, the light emitting module carries out the light display around the guide robot to display the warning region surrounding the guide robot, thereby warning people of not letting the tips of toes enter the warning region to prevent injury caused by the guide robot to the tips of the toes of a human body and also avoid the influence of the tips of the toes of people on normal movement of the guide robot.

As shown in FIG. 5, which is a flowchart of a third embodiment of a method of calibrating a moving region of a guide robot of the disclosure, this embodiment is based on the solution of the above-mentioned first or second embodiment. In this embodiment, the pending moving region also includes a maximum warning region (a circular region X as shown in FIG. 6), and the step S20 includes:

Step S202, the controller determines region calibration parameters corresponding to a received movement instruction according to a predetermined mapping relation between the movement instruction and the region calibration parameters, determines a moving prewarning region according to the determined region calibration parameters, and detects whether an obstacle exists within a preset size range on a movement path corresponding to the movement instruction or not, wherein the region calibration parameters include the pending moving region of the guide robot, the pending moving region includes a normally-on warning region and the maximum warning region, and the moving prewarning region is an annular region (which is surrounded by circular regions D and X in FIG. 6) surrounded by the normally-on warning region and the maximum warning region; and in this embodiment, the preset size range on the moving path corresponding to the movement instruction includes the maximum warning region corresponding to the movement instruction.

In this solution, the step that after the movement instruction is received, whether the obstacle exists within the preset size range on the movement path corresponding to the movement instruction or not is then detected is mainly to determine whether a danger exists on a path, where the guide robot is about to move, or not, wherein the movement path corresponding to the movement instruction is interpreted as: when the movement instruction is a forward movement instruction, its corresponding movement path is a path where the guide robot passes during forward movement; when the movement instruction is a backward movement instruction, its corresponding movement path is a path where the guide robot passes during backward movement; when the movement instruction is a left turning instruction, its corresponding movement path is a path where the guide robot passes during left turning; and when the movement instruction is a right turning instruction, its corresponding movement path is a path where the guide robot passes during right turning, wherein proper range values may be set for the preset size ranges on the forward movement path and the backward movement path, but for the left turning path and the right turning path, their preset size ranges are required to be correspondingly set as range values capable of covering moving regions where the guide robot passes during turning, so that a detection result is meaningful. Here, the detection operation may be carried out by sensors, such as infrared sensors and ultrasonic sensors, of the guide robot.

Step S203, the controller determines region calibration parameters of the light emitting module in the determined moving prewarning region according to an obstacle detection result.

In one embodiment of the disclosure, the step S203 includes:

a provided distance sensor detects a distance d between the obstacle and the robot in real time or regularly;

if the detected distance d is shorter than or equal to the minimum warning distance $d_{min}$ (for example, a distance between an intersection, which is formed by a connecting line of the obstacle and the robot and a boundary line of the normally-on warning region, and the robot is the minimum warning distance between the obstacle and the normally-on warning region) between the obstacle and the normally-on warning region, the region calibration parameters are determined as predetermined first region calibration parameters;

if the detected distance d is longer than the minimum warning distance $d_{min}$ between the obstacle and the normally-on warning region, and shorter than or equal to the maximum warning distance d. (for example, a distance between an intersection, which is formed by the connecting line of the obstacle and the robot and a boundary line of the maximum warning region, and the robot is the maximum warning distance between the obstacle and the maximum warning region) between the obstacle and the maximum warning region, a current speed v of the robot is detected, current warning parameters f(d, v) are calculated according to the detected distance d and the current speed v of the robot based on a preset first warning parameter formula (for example, the first warning parameter formula is as follows: f(d, v)=c+m*(v/d), c and m are both constants), and second region calibration parameters corresponding to the calculated warning parameters are determined as the region calibration parameter according to a predetermined mapping relation between the warning parameter and the region calibration parameter;

if the detected distance d is longer than the maximum warning distance $d_{max}$ between the obstacle and the maximum warning region, the current speed v of the robot is detected, the maximum design speed $v_{max}$ of the robot is determined, current warning parameters f(d, v) are calculated according to the current speed v and the maximum design speed $v_{max}$ of the robot based on a preset second warning parameter formula (for example, the second warning parameter formula is as follows: $f(d, v)=c+n*(v/v_x)$, c and m are both constants), and third region calibration parameters corresponding to the calculated warning parameters are determined as the region calibration parameters according to a predetermined mapping relation between the warning parameter and the region calibration parameter.

In the above-mentioned embodiment, different region calibration parameters of the moving warning region are determined according to the distance between the obstacle and the robot, and the moving speed of the robot and a distance between a pedestrian and the robot correspond to the region calibration parameters; the faster the robot, the closer the pedestrian to the robot; the region calibration parameters may be set to be more emergent (for example, the light flickering frequency is higher) to show a greater warning significance.

A display region division mode available for the method of the solution is provided below:

the whole light display range centers on the guide robot, and a circle of lighting region is formed on the ground; and the whole lighting region is selected in accordance with the following conditions:

1. this region may not be too small, which must cover a perpendicular projection region of the guide robot on the ground and keep an allowance;

2. this region has dynamic adjustability, which must mark a possible range of movement of the guide robot and display corresponding regions according to an actual movement trend;

3. the warning region may not be too large; a too large warning region easily causes a psychological line of defense to a user, and the user would get too far away from the guide robot, thus affecting an interaction effect between the user and the guide robot (for example, a camera may not acquire information of the user, a microphone may not collect voices of the user, and the user standing too far away cannot operate the touch screen).

Figure 7:
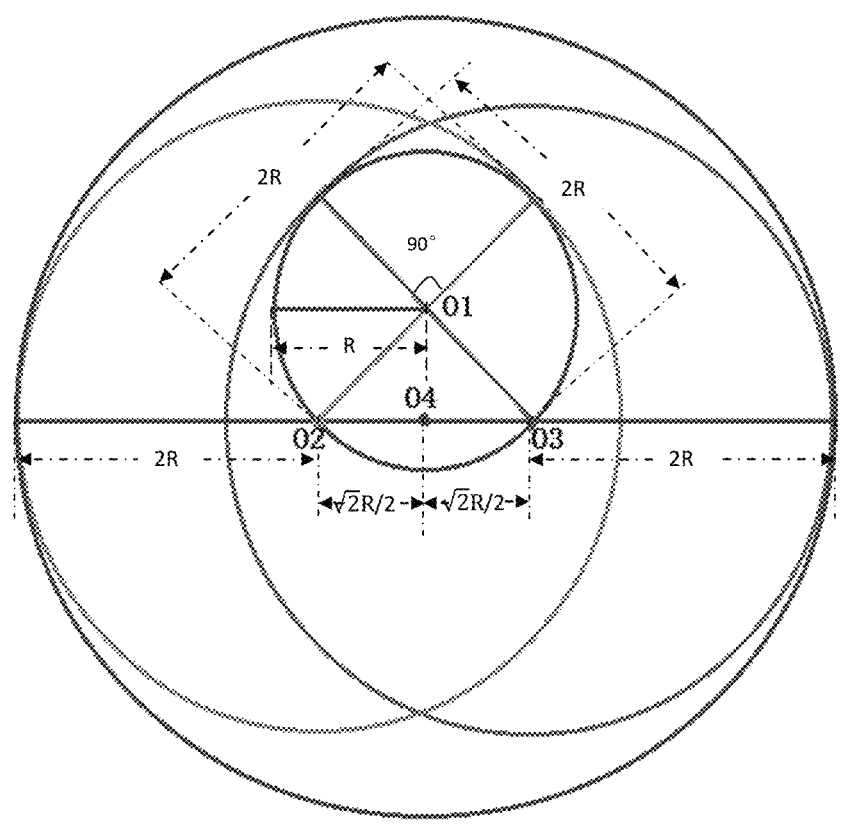
FIG. 7 is a geometrical schematic diagram of calculation of a radius of a circle X in FIG. 6.

According to the above requirements, a design as shown in FIG. 6 is made. A circular region A is a minimum external circle generated by a projection of the guide robot; left and right small circles on the circular region A are driving wheels B; a small circle on the circular region A is a driven wheel C; the positions of the two driving wheels B and the circle center of the circular region A form included angles of 90 degrees; turning of the guide robot is a differential motion taking one driving wheel as a shaft; supposing that the radius of the circular region A is R, a circular region Z and a circular region Y are respectively regions where the guide robot needs to pass during left turning and right turning; rims of the circle Z and the circle Y may be highlighted by the laser devices; the radiuses of the circle Z and the circle Y are 2R; a region required for left turning and right turning is a union set of the circular region Z and the circular region Y, so that a light display region of the light emitting module needs to cover the two circular regions (namely the circle Z and the circle Y), and the minimum external circle of the two circular regions is selected as an area of the light display region of the light emitting module, which is the circular region X in the figure;

With reference to FIG. 6 and FIG. 7, it is known that the radiuses of the circle Z (with its circle center 02) and the circle Y (with its circle center 03) are 2R, and the circle Z and the circle Y form the included angles of 90 degrees with the circle center 01 of the circular region A; 04 (which is the circle center of the circle X) is the center of a connecting line 0203, so that the corresponding radius of the circle X is $D=2R+\sin 45°*R$.

If the circular region X is displayed as a whole light and shadow region, the third article of the design principle may not be met as the warning region is too large, so that a division scheme will be further made below:

1) a minimum region (the circular region D as shown in FIG. 6), which is wider than a projection area of the guide robot by 5 to 10 cm, is designated around the guide robot, and is used as the normally-on warning region, its rim may be highlighted by the laser devices, and the above-mentioned conditions 1 and 3 are met;

2) a light and shadow display mode is added for displaying according to cases; the controller of the guide robot controls the light emitting module according to the received movement instruction to mark the corresponding moving region (namely the pending moving region), so that display of unnecessary regions is reduced, and the above-mentioned conditions 2 and 3 are met;

To be specific, a display mode designed for the guide robot may include:

1. the normally-on warning region;
2. a left turning mode, correspondingly displaying and calibrating a region for left turning;
3. a right turning mode, correspondingly displaying and calibrating a region for right turning;
4. a forward movement mode, correspondingly displaying and calibrating a section of fan-shaped region in front of the guide robot;
5. a backward movement mode, correspondingly displaying and calibrating a section of fan-shaped region behind the guide robot;
6. a fast forward movement mode, correspondingly displaying and calibrating a section of fan-shaped region behind the guide robot, and emitting laser towards the front side through the laser devices to display the edge of a path;

wherein distributions of the colors and the brightness and the display forms of all the regions may all be preset according to requirements.

It should be noted that the above is only one region division solution provided by the disclosure, but not intended to limit the scope of protection of the scheme of the disclosure. The method of the disclosure also may be applicable to other region division schemes.

A computer readable storage medium is further provided, which is applied to a guide robot, and stores a moving region calibration program. The moving region calibration program is executed by a controller to implement the following steps:

a1. a movement instruction is detected and received;

a2. region calibration parameters corresponding to the received movement instruction are determined according to a predetermined mapping relation between the movement instruction and the region calibration parameters, wherein the region calibration parameters include a pending moving region of the guide robot, a light display parameter in the pending moving region, and a driving parameter corresponding to the pending moving region and the light display parameter;

a3. the light emitting module is driven to carry out light display calibration in the pending moving region according to the determined region calibration parameters.

Further, the moving region calibration program is executed to further implement the following steps:

preset normally-on warning region parameters are obtained, wherein the normally-on warning region parameters include a normally-on warning region, a light display parameter in the normally-on warning region, and a driving parameter corresponding to the normally-on warning region and the light display parameter in the normally-on warning region, and the normally-on warning region is a region surrounding the guide robot;

the light emitting module is driven to carry out light display calibration in the normally-on warning region according to the obtained normally-on warning region parameters.

Further, the step a2 includes:

the region calibration parameters corresponding to the received movement instruction are determined according to the predetermined mapping relation between the movement instruction and the region calibration parameters, the moving prewarning region is determined according to the determined region calibration parameters, and whether an obstacle exists within a preset size range on a movement path corresponding to the movement instruction or not is detected, wherein the region calibration parameters include the pending moving region of the guide robot, the pending moving region includes the normally-on warning region and the maximum warning region, and the moving prewarning region is an annular region surrounded by the normally-on warning region and the maximum warning region;

region calibration parameters of the light emitting module in the determined moving prewarning region are determined according to an obstacle detection result.

Further, the step that the region calibration parameters of the light emitting module in the moving prewarning region are determined according to the obstacle detection result includes:

a provided distance sensor detects a distance d between the obstacle and the robot in real time or regularly;

if the detected distance d is shorter than or equal to the minimum warning distance $d_{min}$ between the obstacle and the normally-on warning region, the region calibration parameters are determined as predetermined first region calibration parameters;

if the detected distance d is longer than the minimum warning distance $d_{min}$ between the obstacle and the normally-on warning region, and shorter than or equal to the maximum warning distance $d_{max}$ between the obstacle and the maximum warning region, a current speed v of the robot is detected, current warning parameters are calculated according to the detected distance d and the current speed v of the robot based on a preset first warning parameter formula, and second region calibration parameters corresponding to the calculated warning parameters are determined as the region calibration parameters according to a predetermined mapping relation between the warning parameter and the region calibration parameter;

if the detected distance d is longer than the maximum warning distance $d_{max}$ between the obstacle and the maximum warning region, the current speed v of the robot is detected, the maximum design speed $v_{max}$ of the robot is determined, current warning parameters are calculated according to the current speed v and the maximum design speed $v_{max}$ of the robot based on a preset second warning parameter formula, and third region calibration parameters corresponding to the calculated warning parameters are determined as the region calibration parameters according to a predetermined mapping relation between the warning parameter and the region calibration parameter.

The specific embodiment of the computer readable storage medium of the disclosure is basically the same as the above-mentioned embodiments of the method of calibrating the moving region, so that no more details will be given here.

By the description of the foregoing implementation modes, it will be evident to those skilled in the art that the methods according to the above embodiments may be implemented by means of software and a necessary general-purpose hardware platform; they may of course be implemented by hardware, but in many cases the former will be more advantageous. Based on such an understanding, the essential technical solution of the disclosure, or the portion that contributes to the prior art may be embodied as software products. Computer software products can be stored in a storage medium (e.g., an ROM/RAM, a magnetic disk, an optical disc) and may include a plurality of instructions causing a set of terminal equipment (e.g., a mobile phone, a computer, a server, or network equipment) to execute the methods described in the various embodiments of the disclosure.

The foregoing embodiments are only preferred embodiments of the disclosure and therefore are not intended as limiting the patentable scope of the disclosure. Equivalent structure transformations made by contents of the specification and the accompanying drawings of the disclosure, or direct/indirect application to other relevant technical fields shall all fall within the scope of patentable protection of the disclosure under the inventive concept of the disclosure.

What is claimed is:

1. A method of calibrating a moving region of a guide robot, wherein the guide robot comprises a signal receiving unit for receiving a movement instruction, a controller and a light emitting module, the method comprising:

a1. detecting and receiving the movement instruction, and sending the received movement instruction to the controller by the signal receiving unit;

a2. determining region calibration parameters of the light emitting module according to the received movement instruction by the controller, wherein the region calibration parameters include a pending moving region of the guide robot, a light display parameter in the pending moving region, and a driving parameter corresponding to the pending moving region and the light display parameter; wherein the step a2 comprises:

determining a moving prewarning region according to the region calibration parameters, and detecting whether an obstacle exists within a preset size range on a movement path corresponding to the movement instruction or not, wherein the pending moving region includes a normally-on warning region and a maximum warning region, and the moving prewarning region is an annular region surrounded by the normally-on warning region and the maximum warning region;

detecting a distance d between the obstacle and the robot in real time or regularly by a provided distance sensor; and determining the region calibration parameters of the light emitting module in the moving prewarning region according to the relationship among the distance d, a minimum warning distance $d_{min}$, between the obstacle and the normally-on warning region, and a maximum warning distance $d_{max}$ between the obstacle and the maximum warning region, as well as a current speed v of the robot;

a3. driving the light emitting module to carry out light display calibration in the pending moving region by the controller according to the region calibration parameters.

2. The method of calibrating the moving region of the guide robot of claim 1, wherein before the step a1, the method of calibrating the moving region further comprises:

obtaining preset normally-on warning region parameters by the controller, wherein the preset normally-on warning region parameters include a normally-on warning region, a light display parameter in the normally-on warning region, and a driving parameter corresponding to the normally-on warning region and the light display parameter in the normally-on warning region, and the normally-on warning region is a region surrounding the guide robot;

driving the light emitting module to carry out light display calibration in the normally-on warning region by the controller according to the normally-on warning region parameters.

3. The method of calibrating the moving region of the guide robot of claim 2, wherein the step a2 comprises:

determining the region calibration parameters corresponding to the movement instruction by the controller according to the predetermined mapping relation between the movement instruction and the region calibration parameters, determining a moving prewarning region according to the region calibration parameters, and detecting whether an obstacle exists within a preset size range on a movement path corresponding to the movement instruction or not, wherein the region calibration parameters include the pending moving region of the guide robot, the pending moving region includes the normally-on warning region and a maximum warning region, and the moving prewarning region is an annular region surrounded by the normally-on warning region and the maximum warning region;

determining a region calibration parameter of the light emitting module in the moving prewarning region by the controller according to an obstacle detection result.

4. The method of calibrating the moving region of the guide robot of claim 1, wherein the step of determining the region calibration parameters of the light emitting module in the moving prewarning region comprises:

if the distance d is shorter than or equal to a minimum warning distance $d_{min}$ between the obstacle and the normally-on warning region, determining the region calibration parameters as predetermined first region calibration parameters;

if the distance d is longer than the minimum warning distance $d_{min}$ between the obstacle and the normally-on warning region, and shorter than or equal to a maximum warning distance $d_{max}$ between the obstacle and the maximum warning region, detecting the current speed v of the robot, calculating current first warning parameters according to the distance d and the current speed v of the robot based on a preset first warning parameter formula to obtain calculated current first warning parameters, and determining second region calibration parameters corresponding to the calculated first warning parameters as the region calibration parameters according to a predetermined mapping relation between a warning parameter and the region calibration parameter of the light emitting module in the moving prewarning region;

if the distance d is longer than the maximum warning distance $d_{max}$ between the obstacle and the maximum warning region, detecting the current speed v of the robot, determining a maximum design speed $v_{max}$ of the robot, calculating current second warning parameters according to the current speed v and the maximum design speed $v_{max}$ of the robot based on a preset second warning parameter formula, and determining third region calibration parameters corresponding to the calculated second warning parameters as the region calibration parameters according to the predetermined mapping relation between the warning parameter and the region calibration parameter.

5. A guide robot, comprising a shell, a controller, a memory and a light emitting module arranged on the shell, wherein the light emitting module is electrically connected with the controller; the controller has a signal input end for receiving a movement instruction; the guide robot further comprises a moving region calibration program, wherein the moving region calibration program is stored in the memory, and operated on the controller; and the moving region calibration program is executed by the controller to implement following steps:

a1. detecting and receiving the movement instruction, and sending the received movement instruction to the controller by the signal receiving unit;

a2. determining region calibration parameters of the light emitting module according to the movement instruction, wherein the region calibration parameters include a pending moving region of the guide robot, a light display parameter in the pending moving region, and a driving parameter corresponding to the pending moving region and the light display parameter; wherein the step a2 comprises:

determining a moving prewarning region according to the region calibration parameters, and detecting whether an obstacle exists within a preset size range on a movement path corresponding to the movement instruction or not, wherein the pending moving region includes a normally-on warning region and a maximum warning region, and the moving prewarning region is an annular region surrounded by the normally-on warning region and the maximum warning region;

detecting a distance d between the obstacle and the robot in real time or regularly by a provided distance sensor; and determining the region calibration parameters of the light emitting module in the moving prewarning region according to the relationship among the distance d, a minimum warning distance $d_{min}$ between the obstacle and the normally-on warning region, and a maximum warning distance $d_{max}$ between the obstacle and the maximum warning region, as well as a current speed v of the robot;

a3. driving the light emitting module to carry out light display calibration in the pending moving region according to the region calibration parameters.

6. The guide robot of claim 5, wherein the controller is used for executing the moving region calibration program to implement following steps before the step a1:

obtaining preset normally-on warning region parameters, wherein the normally-on warning region parameters include a normally-on warning region, a light display parameter in the normally-on warning region, and a driving parameter corresponding to the normally-on warning region and the light display parameter in the normally-on warning region, and the normally-on warning region is a region surrounding the guide robot;

driving the light emitting module to carry out light display calibration in the normally-on warning region according to the normally-on warning region parameters.

7. The guide robot of claim 5, wherein the step of determining the region calibration parameters of the light emitting module in the moving prewarning region comprises:

if the distance d is shorter than or equal to a minimum warning distance $d_{min}$ between the obstacle and the normally-on warning region, determining the region calibration parameters as predetermined first region calibration parameters;

if the distance d is longer than the minimum warning distance $d_{min}$ between the obstacle and the normally-on warning region, and shorter than or equal to a maximum warning distance $d_{max}$ between the obstacle and the maximum warning region, detecting the current speed v of the robot, calculating current first warning parameters according to the distance d and the current speed v of the robot based on a preset first warning parameter formula to obtain calculated current first warning parameters, and determining second region calibration parameters corresponding to the calculated current first warning parameters as the region calibration parameters according to a predetermined mapping relation between a warning parameter and the region calibration parameter of the light emitting module in the moving prewarning region;

if the distance d is longer than the maximum warning distance $d_{max}$ between the obstacle and the maximum warning region, detecting the current speed v of the robot, determining a maximum design speed $v_{max}$ of the robot, calculating current second warning parameters according to the current speed v and the maximum design speed $v_{max}$ of the robot based on a preset second warning parameter formula, and determining third region calibration parameters corresponding to the calculated second warning parameters as the region calibration parameters according to a predetermined mapping relation between the warning parameter and the region calibration parameter.

8. The guide robot of claim 5, wherein the light emitting module is arranged on an outer surface of a chassis of the shell.

9. The guide robot of claim 8, wherein the light emitting module comprises a plurality of LED annular light bars, wherein the plurality of LED annular light bars are axially arranged in a spacing manner; and outer ring walls of the plurality of the LED annular light bars are luminous surfaces and tilt downwards.

10. The guide robot of claim 9, wherein the light emitting module further comprises a plurality of laser devices, wherein the plurality of laser devices are distributed on the chassis along the plurality of the LED annular light bars in a spacing manner.

11. The guide robot of claim 10, wherein the controller comprises a main controller and a 51 single-chip microcomputer; the plurality of the LED annular light bars are connected to a first group of parallel I/O ports of the 51 single-chip microcomputer; the plurality of the laser devices are connected to a second group of parallel I/O ports of the 51 single-chip microcomputer; and a signal output end of the main controller is connected to a serial I/O port of the 51 single-chip microcomputer.

12. The guide robot of claim 11, wherein a plurality of sensors distributed along a circumferential direction of the shell are arranged on the shell; and the plurality of the sensors are electrically connected to the controller, and are configured to detect whether an obstacle exists in a corresponding region around the shell or not, and feed detection results back to the controller.

13. The guide robot of claim 5, wherein a plurality of sensors distributed along a circumferential direction of the shell are arranged on the shell; and the plurality of the sensors are electrically connected to the controller, and are configured to detect whether an obstacle exists in a corresponding region around the shell or not, and feed detection results back to the controller.

14. A non-transitory computer readable storage medium, wherein the computer storage medium is applied to a guide robot, and stores a moving region calibration program; and the moving region calibration program is executed by a controller to implement following steps:
   a1. detecting and receiving a movement instruction, and sending the received movement instruction to the controller by the signal receiving unit;
   a2. determining region calibration parameters corresponding to the movement instruction according to a predetermined mapping relation between the movement instruction and the region calibration parameters, wherein the region calibration parameters include a pending moving region of the guide robot, a light display parameter in the pending moving region, and a driving parameter corresponding to the pending moving region and the light display parameter; wherein the step a2 comprises:
      determining a moving prewarning region according to the region calibration parameters, and detecting whether an obstacle exists within a preset size range on a movement path corresponding to the movement instruction or not, wherein the pending moving region includes a normally-on warning region and a maximum warning region, and the moving prewarning region is an annular region surrounded by the normally-on warning region and the maximum warning region;
      detecting a distance d between the obstacle and the robot in real time or regularly by a provided distance sensor; and
      determining the region calibration parameters of the light emitting module in the moving prewarning region according to the relationship among the distance d, a minimum warning distance $d_{min}$ between the obstacle and the normally-on warning region, and a maximum warning distance $d_{max}$ between the obstacle and the maximum warning region, as well as a current speed v of the robot;
   a3. driving a light emitting module to carry out light display calibration in the pending moving region according to the region calibration parameters.

15. The computer readable storage medium of claim 14, wherein the moving region calibration program is executed to further implement following steps:
   obtaining preset normally-on warning region parameters, wherein the normally-on warning region parameters include a normally-on warning region, a light display parameter in the normally-on warning region, and a driving parameter corresponding to the normally-on warning region and the light display parameter in the normally-on warning region, and the normally-on warning region is a region surrounding the guide robot;
   driving the light emitting module to carry out light display calibration in the normally-on warning region according to the normally-on warning region parameters.

16. The non-transitory computer readable storage medium of claim 14, wherein the step of determining the region calibration parameters of the light emitting module in the moving prewarning region comprises:
   if the distance d is shorter than or equal to a minimum warning distance $d_{min}$ between the obstacle and the normally-on warning region, determining the region calibration parameters as predetermined first region calibration parameters;
   if the distance d is longer than the minimum warning distance $d_{min}$ between the obstacle and the normally-on warning region, and shorter than or equal to a maximum warning distance $d_{max}$ between the obstacle and the maximum warning region, detecting the current speed v of the robot, calculating current first warning parameters according to the distance d and the current speed v of the robot based on a preset first warning parameter formula to obtain calculated current first warning parameters, and determining second region calibration parameters corresponding to the calculated current first warning parameters as the region calibration parameters according to a predetermined mapping relation between a warning parameter and the region calibration parameter of the light emitting module in the moving prewarning region;
   if the distance d is longer than the maximum warning distance $d_{max}$ between the obstacle and the maximum warning region, detecting the current speed v of the robot, determining a maximum design speed $v_{max}$ of the robot, calculating current second warning parameters according to the current speed v and the maximum design speed $v_{max}$ of the robot based on a preset second warning parameter formula, and determining third region calibration parameters corresponding to the calculated second warning parameters as the region calibration parameters according to a predetermined mapping relation between the warning parameter and the region calibration parameter.

* * * * *